United States Patent [19]

Mitchell et al.

[11] 4,189,413
[45] Feb. 19, 1980

[54] PHOSPHAZENE RUBBER LATICES

[75] Inventors: George B. Mitchell, Canton; Arthur E. Oberster, N. Canton, both of Ohio

[73] Assignee: The Firestone Tire & Rubber Company, Akron, Ohio

[21] Appl. No.: 895,169

[22] Filed: Apr. 11, 1978

[51] Int. Cl.$^2$ ............................................. C08J 9/30
[52] U.S. Cl. ......................... 260/29.2 M; 260/29.2 N; 521/50; 521/65; 521/907
[58] Field of Search ........... 260/2.5 L, 29.2 M, 29.2 N

[56] References Cited

U.S. PATENT DOCUMENTS

| | | | |
|---|---|---|---|
| 3,215,646 | 11/1965 | Sawyer, Jr. et al. | 260/2.5 L |
| 3,215,649 | 11/1965 | Preiss et al. | 260/2.5 L |
| 3,515,688 | 6/1970 | Rose | 260/2.5 R |
| 3,856,712 | 12/1974 | Reynard et al. | 260/2.5 R |
| 4,055,520 | 10/1977 | Dieck et al. | 260/2.5 R |
| 4,061,606 | 12/1977 | Dieck et al. | 260/2.5 R |
| 4,073,825 | 2/1978 | Dieck et al. | 260/2.5 R |

Primary Examiner—Morton Foelak

[57] ABSTRACT

This invention relates to aqueous dispersions or latices of phosphazene rubbers which are useful in the production of coatings and foams, particularly where fire resistant materials are required, and to the resulting coatings and foams prepared using such latices.

7 Claims, 1 Drawing Figure

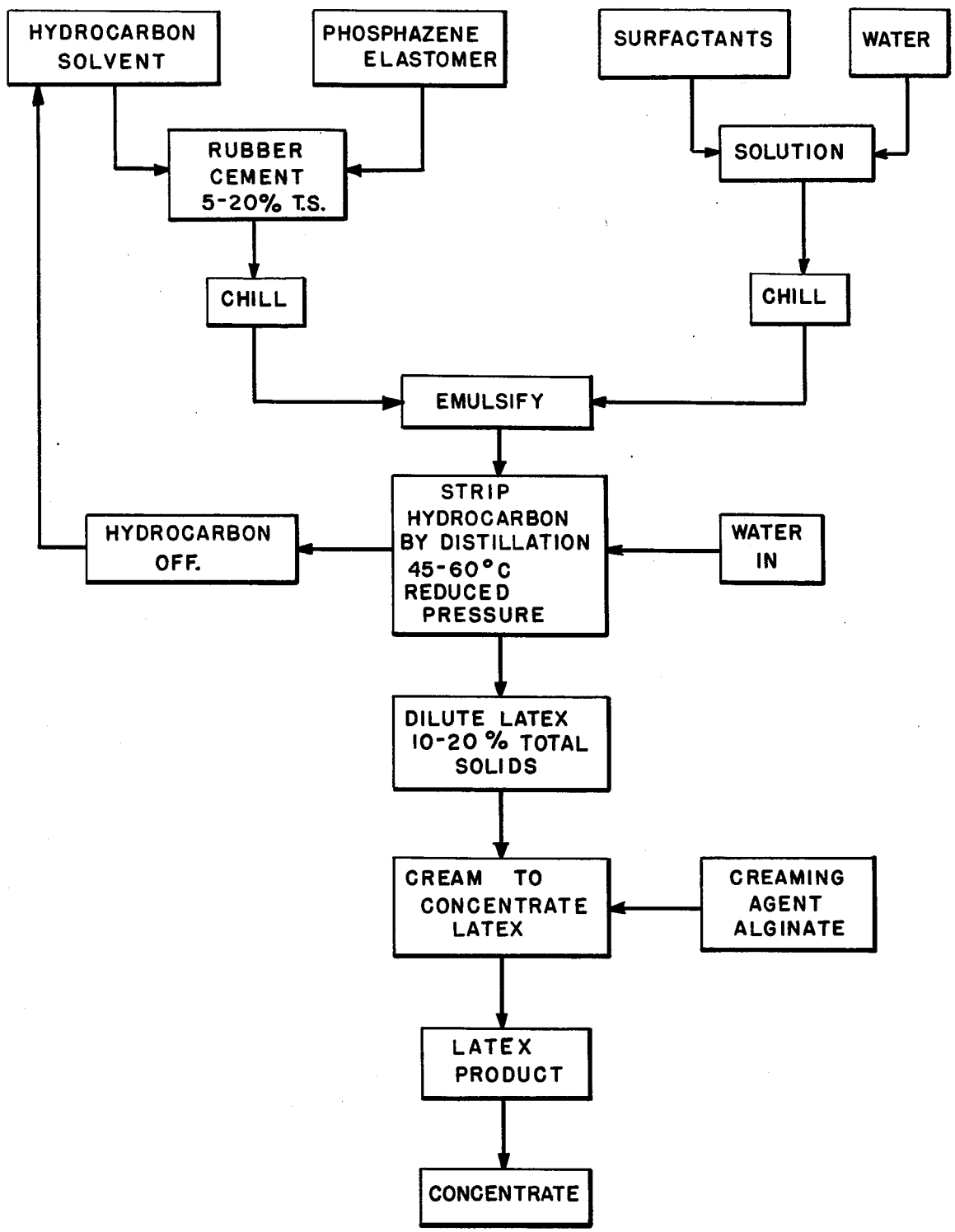

PHOSPHAZENE RUBBER LATICES

This invention relates to improved latices of phosphazene rubbers and to the method of preparing the same.

Aqueous dispersions or latices of phosphazene rubbers are useful in the production of coatings and open-cell foams with enhanced fire resistance as compared with other prior art elastomer coatings and foams.

The preparation of latices of elastomeric materials is described in numerous prior U.S. Pat. Nos. including the following:

2,799,662 issued July 16, 1957 to Ernst and Betts;

3,445,414 issued May 20, 1969 to Glymph and Dawson; and 3,503,917 issued Mar. 31, 1970 to Burke, and others of a similar nature.

It has been found that as each new elastomer is developed new problems arise when attempts are made to disperse them to form latices and particularly when it is desired to form latices in which the elastomeric polymer is present in useful, relatively high concentrations. Thus dispersions of phosphazene rubbers cannot be prepared directly in aqueous systems. In order to make a phosphazene latex suitable for the preparation of a coating or an open-cell rubber foam, it has been found necessary to first dissolve the dry phosphazane rubber in a suitable solvent and then emulsify it with an aqueous solution of a suitable emulsifier as hereinafter described.

The present invention is directed to stable latices of phosphazene rubbers having a high solids content between about 40% and 80% by weight and preferably about 65% and 70% by weight and to coatings and foams prepared from such latices.

The invention will be better understood by reference to the accompanying flowsheet setting forth a preferred procedure for forming a latex or dispersion of a phosphazene rubber in an aqueous medium.

Phosphazene rubbers are linear polymers in which the spine or backbone consists of a chain of alternating P and N atoms, various substituents being attached to the phosphorus atoms, e.g. as described in the following recently issued United States Patents:

| Inventor | Patent No. | Issued |
|---|---|---|
| Allcock et al | 3,370,020 | February 20, 1968 |
| Rose | 3,515,688 | June 2, 1970 |
| Reynard et al | 3,700,629 | October 24, 1972 |
| Rose et al | 3,702,833 | November 14, 1972 |
| Reynard et al | 3,853,794 | December 10, 1974 |
| Reynard et al | 3,856,712 | December 24, 1974 |
| Rose et al | 3,856,713 | December 24, 1974 |
| Reynard et al | 3,883,451 | May 13, 1975 |
| Cheng et al | 3,972,841 | August 3, 1976 | and elsewhere in the published literature.

The substituents are usually found to be distributed randomly along the chain and may include both saturated and unsaturated groups, the latter being present preferably in small amounts as described in the Cheng et al patent noted above.

A general formula for such phosphazene rubbers is

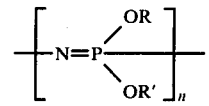

wherein n is an integer from 20 to about 50,000 or more and R and R' are alkyl or aryl groups which may be substituted as in the patents noted above.

EXAMPLE I

Phosphazene polymer (rubber) of the type described above was dissolved in toluene or other hydrocarbon solvent to make up a solution containing between about 5 and 20% polymer depending on molecular weight of polymer. The concentration of the resulting solution is chosen so that the solution possesses a viscosity which permits it to be poured easily.

A combination of anionic and non-ionic surfactants, for example, potassium oleate and Triton X-100 (with or without an additional anionic such as Aquarex D or ME) was dissolved in water. Triton X-100 (Rohm & Haas) is a biodegradable, liquid, anhydrous 100% active non-ionic surface-active agent. It is a water soluble isooctylphenoxyethanol containing 10 moles of ethylene oxide. Triton X-100 is useful as an emulsifier, wetting agent and detergent. Aquarex D (DuPont) and Aquarex ME (DuPont) are anionic surfactants and are useful as general purpose emulsifying agents. They are generally classified as sodium alkyl sulfates. About 10–15 parts of each surfactant per 100 parts of polymer by weight has been found to be suitable. The volume of this emulsifier solution should be about equal to the volume of the polymer solution, prepared above.

Each of these solutions was then chilled in an ice bath to a temperature below about 15° C., e.g. between 10° C. and 15° C.

The chilled emulsifier solution was charged into a high-shear homogenizer such as an Eppenback mixer or other similar emulsifier or homogenizer. For small batches a Waring blender has been used as the mixer.

The emulsifier solution was agitated first in the mixer or blender for a few minutes and then the chilled polymer solution was poured slowly into the partly foamed emulsifier while continuing the agitation at high speed to insure good mixing. After all the toluene-rubber solution had been added, the mixing was continued for some 20–30 minutes to complete the emulsification. Efforts were made to prevent the batch temperature from exceeding 25°–30° C.

The next step was to strip or remove the toluene from the emulsion. This can be conveniently done by azeotropic distillation. In this Example a rotary-type evaporator was used and the toluene and water were collected and measured as the distillation proceeds. The pot temperature was maintained at 55°–65° C. at slightly reduced pressure. Water was added in small amounts occasionally to maintain a suitable volume in the pot. The distillation was continued until no additional toluene was collected.

The latex was then very dilute (10–20% Total Solids) and was concentrated by using a common creaming method. Between about 1 and 2 parts of ammonium alginate by weight per 100 parts of polymer by weight was stirred into the latex and the resulting mixture was agitated for 10–15 minutes after which it was transferred to a separatory funnel and allowed to stand overnight or longer during which time the cream separated. Because the specific gravity of the rubber is greater than water, the cream was on the bottom and could be drawn off from the serum (top) layer containing most of the soap and only between about 1% and 3% total solids (rubber).

The total solids was measured and following the above procedure was found to be in the 45-50% range at this point. It was found that the percent solids could be increased by use of a centrifuge if a higher solids content latex is desired, 15-20 minutes at 1000-2000 rpm being sufficient to yield a latex with 65-70% solids.

A latex prepared in this manner was found to possess good shelf stability and, depending on the emulsifiers selected, the latex exhibited a pH in the range of 8.5-11.5. For foaming or coating applications, latices with 65-70% solids and a pH in the range of 9.5-10.5 are preferred.

The particle size of the rubber was found to vary over a wide range with some particles as fine as 1000° A (0.1 microns) and others as coarse as 10 microns. A preferred average particle size in the range of 2000 to 8000°A (0.2 to 0.8 microns) gave good results in the examples which follow.

EXAMPLE IA

The procedure of Example I was varied by adding the oleic acid to the toluene solution of the polymer. An aqueous solution of potassium hydroxide and either Aquarex D or ME is prepared. After chilling both solutions, the aqueous, alkaline solution is stirred by hand into the polymer/toluene cement. This provides for a partial emulsification. The overall mixture is then charged into the homogenizer and the procedure is the same as that described in Example I.

This procedure provides for an in situ preparation of the potassium oleate. Either procedure is acceptable (i.e. premixing of the oleic acid and KOH to form the Koleate as in Example I or the in situ procedure described above.) Any other variations in the procedure would be the type that would "naturally" be used by any one familiar with the art of latex preparation.

EXAMPLE IB

Example I was repeated using 10-20 parts (phr) of potassium oleate along with 5 phr of Aquarex D or ME in all anionic systems.

This latex can be used in much the same manner as those containing the non-ionic surfactant.

EXAMPLE II

Example I was repeated except that 12.5 g of polymer (polyphosphazene with a DSV of 1.26) was dissolved in sufficient toluene to give a 7.5% solution and the emulsifier was formed by dissolving 1.875 g of potassium oleate (20% solution) and 1.875 g of Triton X (neat) in 17 g of water. After creaming with 25 g of 1% ammonium alginate, 188 g of cream and 17 g of serum were separately recovered. The serum had 2.2% solids and the cream 47% solids.

EXAMPLE III

Example I was repeated using a mixture of equal parts by weight of Triton X, potassium oleate and Aquarex ME as the emulsifier. The cream contained 41% solids which was increased to 52% after centrifuging.

EXAMPLE IV

Example I was repeated using 12 g of polymer and a mixture of equal parts by weight 0.72 g each of Triton X, potassium oleate and Aquarex D.

Each of the above latices could be used in the preparation of foam rubber as described in the following example.

A heat cure of "no-gel", open-cell foam was prepared according to the following formulation:

| Phosphazene Rubber Latex of Example I | 100 parts rubber | |
|---|---|---|
| TKPP* | 0.3-0.5 | phr |
| Aerosol 18* | 5.0-0.5 | phr |
| Potassium Oleate | 1.0-0.5 | phr |
| Ethyl Zimate* | 2.25 | phr |
| Sulfur | 2.25 | phr |
| ZMBT* | 1.00 | phr |
| Antioxidant | 1.00 | phr |
| ZnO | 3.5 | phr |
| Filler* | 100-300 | phr |

*Aerosol 18: Di-Na-N-octadecyl sulfosuccinamate
*Filler can be a CaCO₃ type, a hydrated alumina, etc.
*ZMBT is zinc mercaptobenzothiazole.
*TKPP is tetra-potassium pyrophosphate.
*Ethyl Zimate is zinc diethyl dithiocarbamate Total solids of final latex was measured and found to be in the 70-80% range.

All ingredients were combined and stirred for about one hour. The resulting mixture was foamed (frothed) using a kitchen type beater. The resulting foam was poured onto a piece of burlap or "jute" and the surface was scraped to a foam height of about ¼". The coated burlap was then cured in an oven for about 30 minutes at 125°-135° C.

Other foams were produced following the same general procedure with these additions or omissions:
a. without the TKPP;
b. without the potassium oleate;
c. a blend of a polyphosphazene rubber latex with natural latex was used;
d. a blend of polyphosphazene rubber latex with a standard SBR latex (e.g. a reinforced cold polymerized latex suitable for foam application. T.S. ~70%, 10-11 pH; approximately 30% bound styrene, particle size in the 3000-5000° A range).

Each of the foams was found to cure well, exhibit a smooth surface and possess good texture.

Limited smoke and flame study showed moderately good resistance at high loading of filler.

These types of open-cell foam are suitable for: carpet backing, fabric coating or lining for upholstery purposes, and similar applications where a layer of foam of approximately ¼" can be utilized.

The latices of this invention were also found to be useful in the preparation of coatings as shown by the following Example.

EXAMPLE V

A latex was prepared as in Example I above and formulated with other constituents as follows:

| Polyphosphazene rubber latex | 100 parts of rubber | |
|---|---|---|
| Potassium Oleate | 1.5 | phr |
| Trimeric Base* | 1.0 | phr |
| Sulfur | 2.25 | phr |
| Ethyl Zimate | 1.5 | phr |
| ZMBT | 1.0 | phr |
| Antioxidant | 1.0 | phr |

| | | |
|---|---|---|
| -continued | | |
| Butyl Zimate** | 1.5 | phr |

*Trimeric Base: triethyl trimethylene triamine (processing and sensitizing agent).
**Butyl Zimate is zinc di-n-butyldithiocarbamate The formulation was stirred for 1½ to 2 hours and then poured through cheesecloth. The filtered mixture was poured onto a sheet of Mylar polyethylene terephthalate and scraped with a doctor blade to a thickness of approximately 20 mils. The film was permitted to air dry for 18 hours at room temperature (20° C.) before being placed in a forced air draft oven and held there for one hour at 80°–85° C. The film was stripped from the Mylar base and cured for 16 hours at 50° C. in an oven.

Other smooth translucent films of 0.002–0.025" thickness with good appearance were cast on either glass or other substrates. From this it is seen that films 20–30 mils thick useful as coatings are readily obtained from the polyphosphazene rubber latices.

The procedure of Example V could be varied, e.g. by casting on glass instead of Mylar and by adding the butyl zimate just 10–15 minutes before casting the film.

Having now described preferred embodiments of the invention, it is not intended that it be limited except as may be required by the appended claims.

We claim:

1. A stable synthetic rubber latex having a solids content between about 40% and 80% by weight and exhibiting a pH in the range of 8.5–11.5, from which coatings and open cell foams possessing superior smoke and flammability properties are produced wherein the synthetic rubber is a linear polyphosphazene represented by the formula

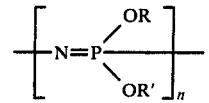

where n is between about 20 and about 50,000 and OR and OR' each represent a monovalent group selected from the group consisting of alkoxy, substituted alkoxy, aryloxy and substituted aryloxy and OR and OR' may be either the same group or may each be one or more different groups and may include some unsaturation and OR and OR' are randomly distributed along the -P-N- chain.

2. A foam prepared from the latex of claim 1.

3. A coating prepared from the latex of claim 1.

4. A film prepared from the latex of claim 1.

5. The latex of claim 1 wherein the phosphazene is an aryloxy polyphosphazene.

6. The latex of claim 1 wherein the total solids content is at least about 45%.

7. The latex of claim 1 wherein the solids content is between about 65% and about 90% and the pH is in the range of about 9.5–10.5.

* * * * *